United States Patent [19]

Klüting

[11] 4,364,536
[45] Dec. 21, 1982

[54] DEVICE FOR ADJUSTING A VEHICLE SEAT

[75] Inventor: Bernd Klüting, Radevormwald, Fed. Rep. of Germany

[73] Assignee: Keiper Automobiltechnik GmbH & Co. KG, Fed. Rep. of Germany

[21] Appl. No.: 83,795

[22] Filed: Oct. 11, 1979

[30] Foreign Application Priority Data

Oct. 13, 1978 [DE] Fed. Rep. of Germany ....... 2844647

[51] Int. Cl.³ ............................................. B60N 1/08
[52] U.S. Cl. ...................................... 248/429; 74/30; 248/393; 248/420
[58] Field of Search ............... 248/420, 430, 424, 429, 248/393, 394, 395; 297/330; 74/30, 29, 32, 33

[56] References Cited

U.S. PATENT DOCUMENTS

| 765,783 | 7/1904 | Morton | 74/32 |
|---|---|---|---|
| 994,627 | 6/1911 | Workman | 74/29 |
| 2,493,493 | 1/1950 | Mariano | 74/29 |
| 2,594,882 | 4/1952 | De Rose | 248/429 |
| 2,788,905 | 4/1957 | Grove | 74/29 X |
| 2,953,190 | 9/1960 | Tanaka | |
| 2,961,032 | 11/1960 | Pickles | 74/30 X |
| 3,022,975 | 2/1962 | Horton et al. | 248/420 |
| 3,313,512 | 4/1967 | Colautti et al. | 248/424 |
| 3,430,516 | 3/1969 | Pickels | 248/420 |
| 3,437,303 | 4/1969 | Pickles | 248/394 |
| 3,858,934 | 1/1975 | Eggert, Jr. | 248/429 |
| 3,870,269 | 3/1975 | Werner et al. | 248/429 |
| 4,089,500 | 5/1978 | Gustafsson | 248/429 |

Primary Examiner—James T. McCall
Attorney, Agent, or Firm—Wigman & Cohen

[57] ABSTRACT

A seat adjusting mechanism, arranged to be operated by an electric motor, for use with a motor vehicle seat is disclosed. The seat adjusting mechanism is supported by at least two slide tracks which extend along the length of the seat and which are placed through glide tracks each spaced away from the vehicle floor. The seat adjusting mechanism comprises at least one rack situated on one of said guide tracks and extends along the length of the guide track. The rack has one end connected by means of a connecting body to the slide track lying above it. The rack contains a long slot which has teeth formed on one side thereof for contacting a pinion which is situated to engage the teeth and is connected to an electric motor for movement of the seat adjusting mechanism. The width of the long slot in the rack serves to retain the pinion in engagement with the teeth of the slot.

12 Claims, 4 Drawing Figures

DEVICE FOR ADJUSTING A VEHICLE SEAT

BACKGROUND OF THE INVENTION

The invention concerns a device for forward and backward adjustment of a vehicle seat, particularly a motor vehicle seat, supported by at least two slide tracks which extend along the length of the seat, and which are placed through guide tracks, each spaced away from the vehicle floor.

BRIEF SUMMARY OF THE INVENTION

The object of the invention is to construct such a seat adjusting device so that it is not only simple but also particularly space saving, because in many cases there is only limited space available to house a seat adjusting device.

The structure of the seat adjusting device according to the present invention is extremely simple, since with the exception of the rack, the connecting body which connects the rack with the slide tracks, and the drive mechanisms, the device exhibits no further parts. Furthermore, its space requirements are small, because little space is required for both the rack lying beneath the guide tracks and the part of the drive mechanism which contacts the rack. Simple installation is a further essential advantage.

Another advantage lies in the fact that the rack is pivotally connected around its longitudinal axis with the "C"-shaped connecting body which surrounds the guide tracks. The rack can then adjust itself in the proper direction, which simplifies its movement in the areas of the pinion. In addition, the pivotable connection can be constructed so that the rack can easily be mounted during assembly.

If one mounts the pinion supporting shaft in a flat drive housing, one can then arrange a guide for the rack between this drive housing and the guide tracks. This assures in a simple space saving fashion the easy adjustability of the rack. The rack does not need to be guided by the pinion then, which is made possible due to the width of the long slot for the rack which constantly holds the pinion in contact with the rack.

To reliably hold the seat in the selected position without an additional locking mechanism, the pinion is preferably engaged with a drive shaft by means of a self restricting worm gear. In a preferred embodiment, this drive shaft is flexible. Such a shaft simply and space efficiently prevents the drive mechanism from jamming when the seat is in its farthest forward or backward position.

BRIEF DESCRIPTION OF THE DRAWINGS

The invention is explained in greater detail hereinbelow by means of an example shown in the drawings, wherein.

DETAILED DESCRIPTION OF A PREFERRED EMBODIMENT

Figure 1:
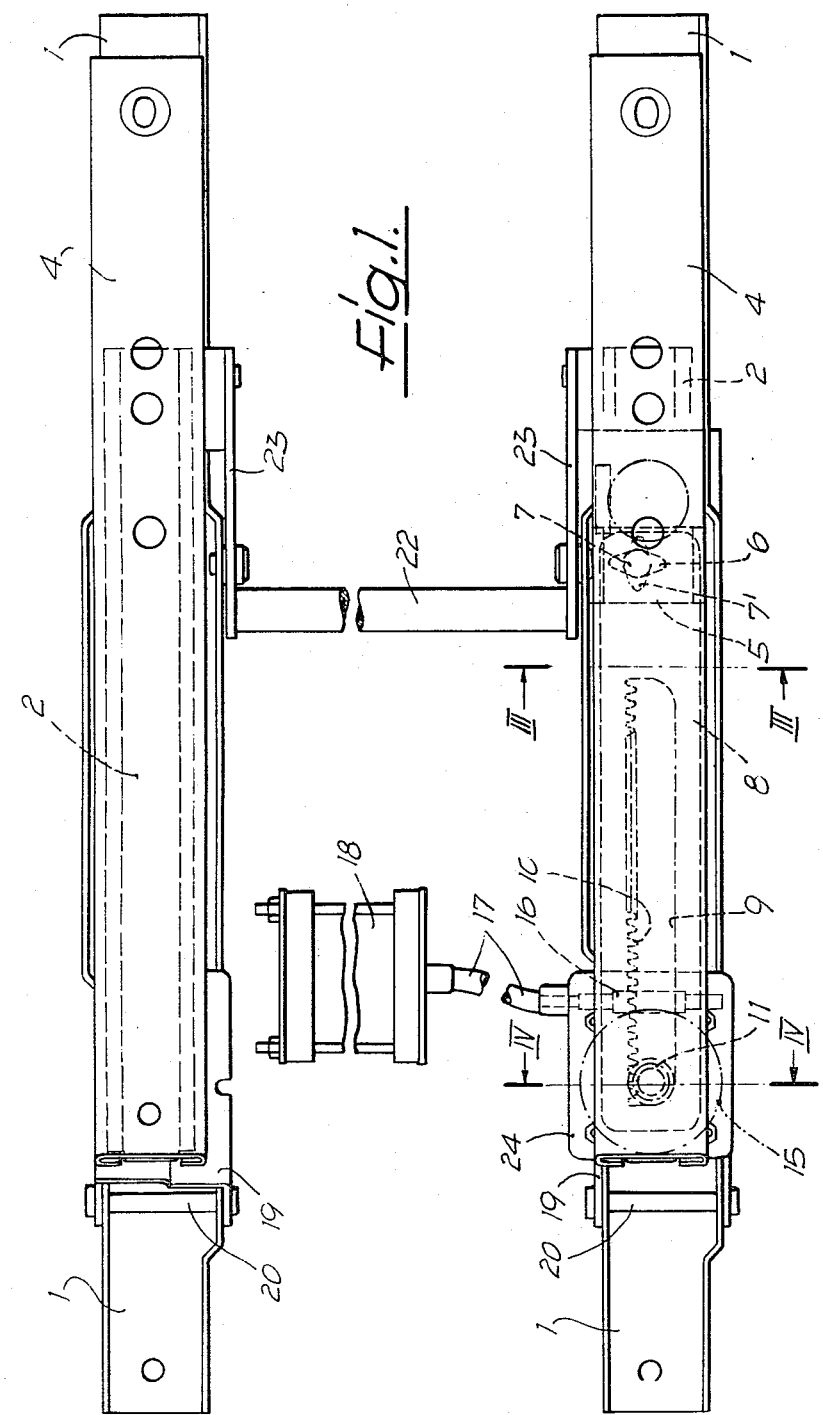
FIG. 1 is a top view of a preferred embodiment installed with the seat removed.

Referring to the drawings, two guide tracks 2 are supported by two consoles 1 extending in the longitudinal direction of the vehicle which are spaced apart from each other on the vehicle floor and are screwed or otherwise secured to the vehicle floor. The guide tracks 2 lie spaced above the consoles which support them and also extend in the longitudinal direction of the vehicle. Each of the two guide tracks could be secured to the associated console by means of spacers. The structure of the connection between the guide tracks and the consoles in the preferred embodiment is explained further below.

Figure 3:
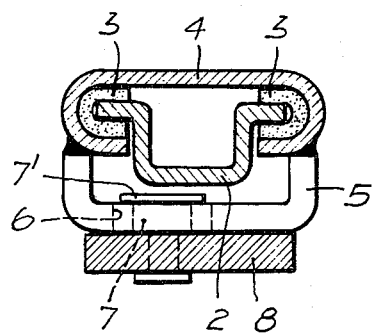
FIG. 3 is a view along line III—III of FIG. 1.
Figure 4:
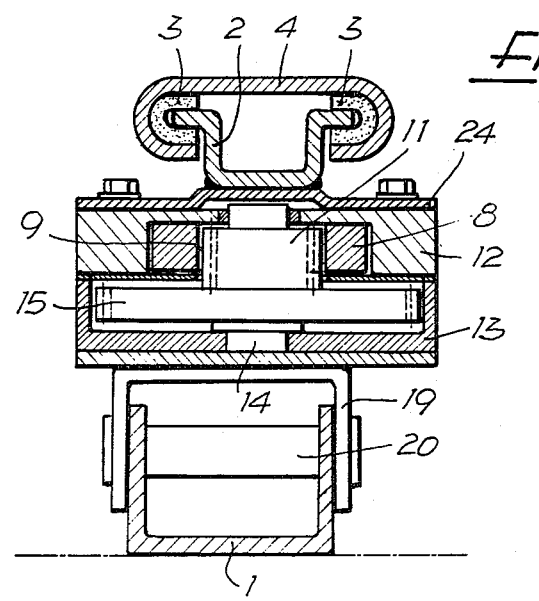
FIG. 4 is a view along line IV—IV of FIG. 1.

In each of the two guide tracks 2, which as shown in FIG. 3, have a U-shaped cross section opening above with end sections of both shanks angled to the outside, a longitudinally adjustable slide track is formed by inserting glide elements 3 in each track 2. As is shown in FIGS. 3 and 4, both slide tracks 4 have a "C"-shaped cross section which surrounds the shanks, angled to the outside, of the guide tracks. The seat frame of the associated, non-depicted vehicle seat is mounted on these two slide tracks 4.

The two shanks of a "U"-shaped connecting body 5, attaching at a distance from the back end of one slide track 4 and from below, are welded to the slide track. The connecting body 5 reaches from below beyond the guide track 2 situated above it without making contact. A diamond-shaped opening 6 is provided in a bar section of connecting body 5 and is spaced below the guide tracks 2 as shown in FIG. 1. A pin 7 extends through this opening. The diamond-shaped head 7' of the pin 7 can be inserted through the opening, in as much as both diamond-shaped elements have identically located axes. The height of the head 7' is barely less than the distance between the lower side of guide track 2 and the bar piece of the connection body 5.

The pin 7 penetrates the rear end section of a rack 8 which is formed as a flat bar. The pin 7 is secured to the rack 8 in such a manner that the longer axis of the diamond formed by the head 7' extends along the longitudinal axis of the rack. Since the longer axis of the diamond-shaped opening 6 extends at right angles to the longitudinal axis of the vehicle, the head 7' can only be placed through the opening 6 when the rack 8 is at right angles to the guide slat 2. After the head 7' has been placed through the rack 8, the rack 8 is brought into the position shown in FIG. 1, i.e., parallel to the guide track 2 and directly beneath it. In this position, the pin 7 is secured to the connecting body 5 and is form fitting, but pivotable.

As shown in FIG. 1, the rack 8 has a longitudinal slot 9 which extends nearly the entire length of the rack. The length of the slot 9 and the rack depend upon the desired seat adjustment range. One long edge of the slot 9 is formed with teeth 10, which engage the pinion 11. The width or breadth of the longitudinal slot 9 is selected so as to hold the pinion 11 at the proper meshing depth and at a very small distance from the edge of the slot opposite the teeth 10. Thus, the pinion can never disengage.

In the area of the forward end of that guide track 2 under which the rack 8 lies, a plate 24 is welded or screwed onto the underside of the guide track 2. The plate extends on the sides beyond the guide track 2. A "U"-shaped guide body 12 is attached on the underside of the plate 24. Both shanks of the guide body 12 serve as lateral guides for the rack 8. The guide body 12, in combination with the plate 24, form a box which surrounds the rack 8. This box guides the rack 8, not only from the sides, but also from above and below.

The flat yoke portion of the guide body 12 forms a lid for a flat drive housing 13. The shaft 14, which supports the pinion 11, is pivotally disposed inside the drive housing 13 with its longitudinal axis perpendicular to the rack 8. A worm wheel 15 sits on the shaft 14 within the drive housing 13. The diameter of the worm wheel 15 in the preferred embodiment is greater than the width of the rack 8, the guide track 2 or the slide track 4. A worm gear 16 is also disposed in the drive housing 13 next to the worm wheel 15. The longitudinal axis of the worm gear 16 lies at right angles to the longitudinal axis of the rack 8. The worm gear 16 is attached so as to allow rotation and to prevent axial displacement. The shaft which supports the worm gear 16 is coupled with a flexible shaft 17 on the inside facing side of the drive housing 13. The other end of the flexible shaft 17 is connected with an electric drive motor 18 disposed between the two guide tracks 2. The flexible shaft 17 prevents the rack drive from jamming, even when it is moved to its outermost positions.

The drive housing 13 could lie directly on a console 1 and be securely fastened to it. In the preferred embodiment, the drive housing is securely fastened to and supported by an attachment 19 which itself is rotatable around the transverse axis 20 and is connected with console 1. This allows adjustment of the seat tilt. The tilt adjustment is carried out with the help of a spindle with a vertical axis 21 which attaches from the underside of guide track 2 directly behind the connecting body 5. Two pivoting levers 23, rigidly connected by a traverse bar 22, are pivotally attached to the console 1 so as to transfer the pivoting motion of one guide track to the other guide track. The spindle 21 is preferably driven by an electric driver motor (not shown).

Figure 2:
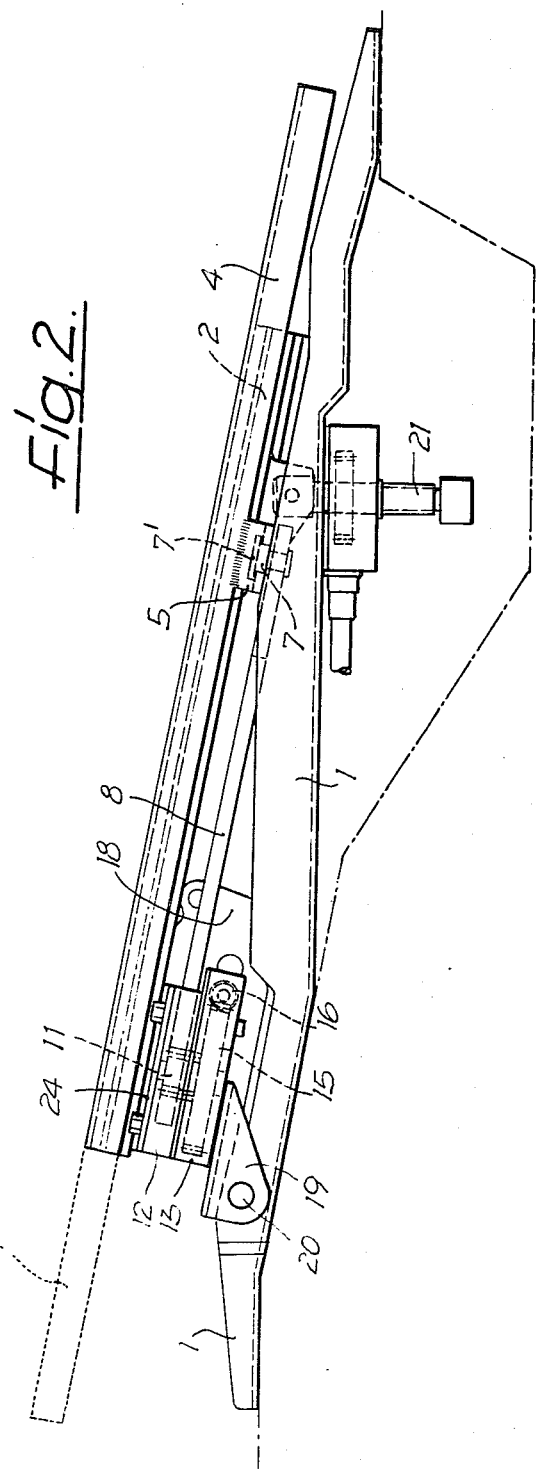
FIG. 2 is a side view of a preferred embodiment installed with the seat removed.

When the seat is to be moved from the rearmost position shown in FIGS. 1 and 2 to the front, the electric drive motor 18 is switched on so that the pinion 11 rotates counter-clockwise when seen as in FIG. 1. This moves the rack 8 to the front i.e. to the left, as seen from the vantage point in FIGS. 1 and 2. Due to the connection of the slide track 4 by means of the pin 7 and the connecting body 5, the slide track 4 is moved to the front the same distance as the rack 8. Since the second slide track is connected through the seat frame with the first slide track, the seat moves evenly to the front. When the desired new seat position is achieved, the electric drive motor 18 is switched off. Due to the self-limitation of the worm gear drive consisting of the worm wheel 15 and the worm gear 16, the seat cannot be accidentally moved to the front or back from the selected position.

Although only a preferred embodiment is specifically illustrated and described herein, it will be appreciated that many modifications and variations of the present invention are possible in light of the above teachings and within the purview of the appended claims without departing from the spirit and intended scope of the invention.

What I claim is:

1. A device for adjusting a vehicle seat, particularly a motor vehicle seat, supported by at least two slide tracks which extend along the length of the seat, and which are placed through guide tracks each spaced away from the vehicle floor by means of console elements, comprising:
    at least one rack situated beneath one of said guide tracks and extending along the length of said guide tracks;
    said rack being separate and distinct from said guide tracks and having one end connected by means of a connecting body with said slide track lying above it;
    said rack having a long slot having a first long edge comprised of teeth forming said rack at at least some portion along its length and having a second long edge opposite said first long edge spaced away from said teeth;
    a drive mechanism; and
    a pinion connected between said drive mechanism and said long slot, wherein said pinion engages said teeth of said rack and is kept in engagement therewith by the spacing of said first and second long edges of said long slot.

2. The device of claim 1, wherein:
    said connecting body is "C"-shaped and encloses said guide track; and
    said rack is pivotally attached to said connecting body around an axis perpendicular to said longitudinal axis of said guide track.

3. The device of claim 2, further including a pin situated at a point where said rack is pivotally attached to said connecting body and extending through an opening in the part to which it is not secured to form a locking formfit, said pin having a head with a shape other than the circular cross-section of said pin, and said opening also having a shape other than said circular cross-section of said pin.

4. The device of claim 2, further including:
    a guide body attached to the underside of said guide track; and
    a preferable flat drive housing attached to said guide box; wherein said rack is disposed between said drive housing and said guide track.

5. The device of claim 4, wherein said pinion is attached to a bearing shaft which is located in said drive housing.

6. The device of claim 4, wherein guide body for said rack is box-shaped and surrounds said rack.

7. The device of claim 5, further including gear means and a drive shaft which link said pinion to said drive mechanism.

8. The device of claim 7, wherein said gear means comprises a worm gear and a worm wheel.

9. The device of claim 8, wherein said worm wheel sits beneath said pinion on said bearing shaft which supports said pinion.

10. The device of claim 8, wherein said worm gear is directly connected with said drive shaft.

11. The device of claim 7, wherein said drive mechanism comprises an electric motor.

12. The device of claim 11, wherein said drive shaft is a flexible shaft and extends from said drive housing to said electric motor.

* * * * *